United States Patent [19]
Watanabe et al.

[11] Patent Number: 5,479,284
[45] Date of Patent: Dec. 26, 1995

[54] INCREASING TEMPERATURE INJECTION METHODS FOR A LIQUID CRYSTAL CELL

[75] Inventors: Yasuyuki Watanabe, Chigasaki; Kazuya Ishiwata, Yokosuka; Masaaki Suzuki, Yokohama; Noriyuki Nakai, Ayase; Takashi Enomoto, Sagamihara; Naoya Nishida, Hadano; Tatsuo Murata, Isehara; Mutsuo Mitsui; Masayuki Shimamune, both of Tokyo, all of Japan

[73] Assignee: Canon Kabushiki Kaisha, Tokyo, Japan

[21] Appl. No.: 107,081

[22] Filed: Aug. 17, 1993

[30] Foreign Application Priority Data

Aug. 19, 1992 [JP] Japan ................... 4-241413

[51] Int. Cl.$^6$ ............................................. G02F 1/1339
[52] U.S. Cl. ............................................. 359/80; 141/7
[58] Field of Search ............................. 359/80; 141/7

[56] References Cited

U.S. PATENT DOCUMENTS

| | | | |
|---|---|---|---|
| Re. 34,690 | 8/1994 | Carrington | 359/80 |
| 4,691,995 | 9/1987 | Yamazaki et al. | 359/80 |
| 4,802,743 | 2/1989 | Takao et al. | 359/68 |
| 5,024,255 | 6/1991 | Watanabe et al. | 141/7 |
| 5,078,475 | 1/1992 | Sekimura et al. | 359/68 |
| 5,150,239 | 9/1992 | Watanabe et al. | 359/80 |
| 5,177,627 | 1/1993 | Ishiwata et al. | 359/68 |
| 5,269,351 | 12/1993 | Yoshihara | 141/7 |
| 5,285,300 | 2/1994 | Suzuki et al. | 359/54 |
| 5,355,236 | 10/1994 | Mitsui | 359/80 |

FOREIGN PATENT DOCUMENTS

| | | |
|---|---|---|
| 0312028 | 4/1989 | European Pat. Off. . |
| 0343902 | 11/1989 | European Pat. Off. . |
| 0347913 | 12/1989 | European Pat. Off. . |
| 0458321 | 11/1991 | European Pat. Off. . |
| 62-237422 | 10/1987 | Japan . |
| 63-015218 | 1/1988 | Japan . |
| 63-223729 | 9/1988 | Japan . |
| 1-031118 | 2/1989 | Japan . |
| 4316021 | 11/1992 | Japan . |

*Primary Examiner*—William L. Sikes
*Assistant Examiner*—Ron Trice
*Attorney, Agent, or Firm*—Fitzpatrick, Cella, Harper & Scinto

[57] ABSTRACT

A large-sized liquid crystal panel uniformly filled with a liquid crystal material may be produced through a process including the steps of: fixing a pair of substrates with a sealing member disposed therebetween to form a blank panel having an injection port, reducing a pressure within the panel, applying a liquid crystal material onto the injection port, heating the liquid crystal material to its isotropic temperature, injecting the liquid crystal material into the panel under a pressure, and filling the panel with the liquid crystal material under heating and pressurization from the injection port toward the panel inside. The pressure within the panel before the injection is reduced at a rate not exceeding 25 torr/min. The pressure for injection is increased at varying rates, e.g., with an intermediate constant pressure period. In the filling step, a portion of the liquid crystal material near the injection port is held in its isotropic phase and the liquid crystal material except for the portion is transformed at least once into a smectic phase.

7 Claims, 7 Drawing Sheets

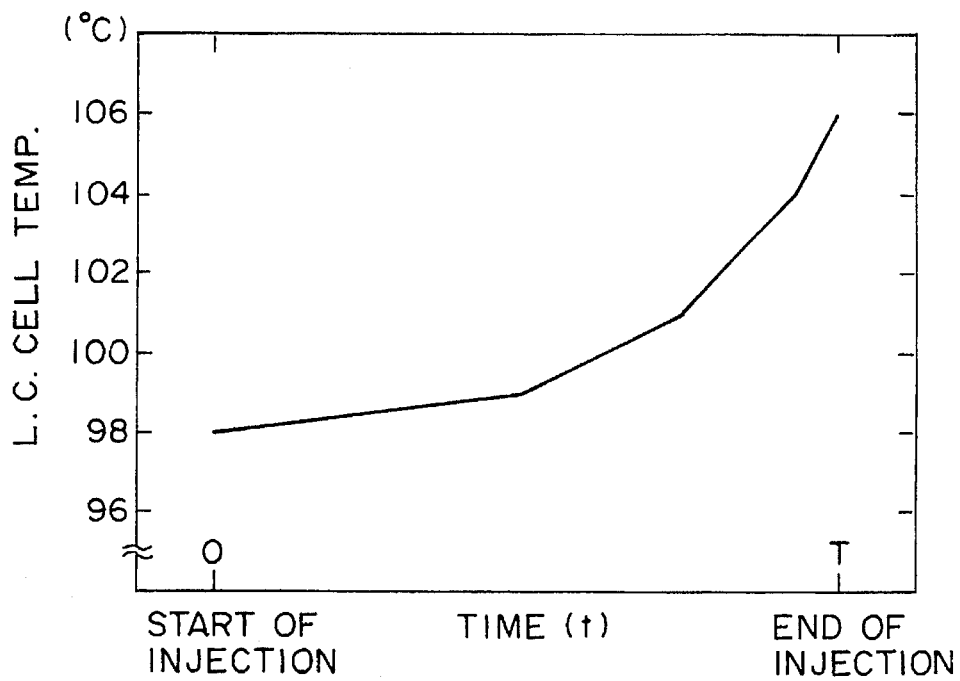
F I G. 6
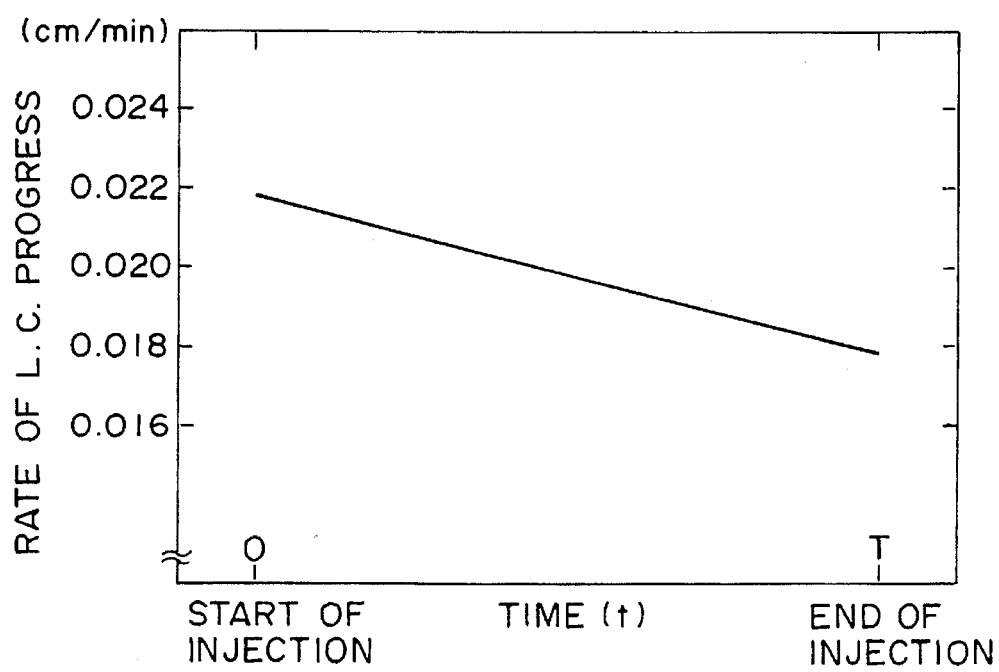
F I G. 7

INCREASING TEMPERATURE INJECTION METHODS FOR A LIQUID CRYSTAL CELL

FIELD OF THE INVENTION AND RELATED ART

The present invention relates to a process for producing a liquid crystal panel characterized by a step of injecting a liquid crystal into a cell gap or panel gap defined between a pair of opposing substrates and a filling step after the injection step.

In a conventional process for preparing a liquid crystal panel, a pair of substrates are applied to each other with adhesive particles and a sealing material disposed therebetween to form a blank panel, a liquid crystal material and the panel are held in a reduced-pressure chamber, the interior of the chamber is reduced in pressure and heated, the liquid crystal material is applied onto an injection port of the panel, and the chamber is restored to the atmospheric pressure and further pressurized to inject the liquid crystal material at a lowered viscosity into the panel.

When the panel is restored to room temperature after the liquid crystal injection, a void can occur within a panel, particularly within a large-sized panel, due to shrinkage of the liquid crystal material. For this reason, it has been conventionally practiced to further heat the liquid crystal and pressurization of the panel inside from the injection port so as to uniformly increase the filling or packing density of the liquid crystal and remove the void.

Hitherto, in the injection step, it has been principally considered to minimize the time for injecting and filling the liquid crystal material, and there has not been paid any attention to appropriate control of the rate of reducing the pressure within the vessel, control of the rate of liquid crystal material progressing within the panel during the injection step and consideration of adverse effects by placing the liquid crystal material at an elevated temperature condition throughout the entire process for a long period.

SUMMARY OF THE INVENTION

Accordingly, a principal object of the present invention is to provide a process for producing a liquid crystal panel with improved liquid crystal injection and liquid crystal filling steps.

According to the present invention, there is provided a process for producing a liquid crystal panel, comprising the steps of: applying a pair of substrates to each other with adhesive particles for providing a prescribed gap and a sealing member for enclosing a liquid crystal material disposed therebetween so as to provide a blank panel with an adhesive strength of 10–50 g/mm$^2$ by the adhesive particles, and injecting a liquid crystal material into the panel, wherein the blank panel before the liquid crystal injection is reduced in pressure at a rate not exceeding 25 torr/min.

According to another aspect of the present invention, there is provided a process for producing a liquid crystal panel, comprising the steps of: fixing a pair of substrates with a sealing member disposed therebetween to form a blank panel having a prescribed gap between the substrates and having an injection port, and injecting a liquid crystal material through the injection port into the panel so that the liquid crystal material progresses within the panel at a speed v(t) at time t from start of the injection satisfying 0.5 $v_a \leq v(t) \leq 1.5\ v_a$, wherein $v_a$ denotes an average speed within a range of 0.005–0.5 cm/min. determined by an equation:

$$v_a = (1/T) \int_0^T v(t)\,dt,$$

wherein T denotes a total period of the injection step.

According to a further aspect of the present invention, there is provided a process for producing a liquid crystal panel, comprising: fixing a pair of substrates with a sealing member disposed therebetween to form a blank panel having a prescribed gap between the substrates and having an injection port, injecting a liquid crystal material through the injection port into the panel, and filling the panel with the liquid crystal material under heating and pressurization from the injection port toward an inside of the panel, wherein, in the filling step, a portion of the liquid crystal material near the injection port is held in its isotropic phase and the liquid crystal material except for the portion near the injection port is transformed at least once from the isotropic phase to a smectic phase.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6 is a graph showing a temperature profile of a liquid crystal cell in a liquid crystal injection step in Example 4 of the invention.

FIG. 7 is a graph showing a change in rate of liquid crystal progress in Example 4.

DESCRIPTION OF THE PREFERRED EMBODIMENTS

According to a first embodiment of the present invention, the interior of a panel is reduced in pressure before injection of a liquid crystal material thereinto at a rate which is slower than that adopted conventionally so as to reduce a pressure applied to the panel inside faces, thus preventing damage or breakage of the panel. More specifically, a panel is prepared by applying a pair of substrates to each other with adhesive particles and a sealing member for enclosing a liquid crystal material disposed therebetween at an adhesive strength by the adhesive particles of 10–50 g/mm² so as to keep a prescribed gap between the substrates and, before liquid crystal injection, the inside of the panel is reduced in pressure from the atmospheric pressure at a rate not exceeding 25 torr/min.

Figure 1:
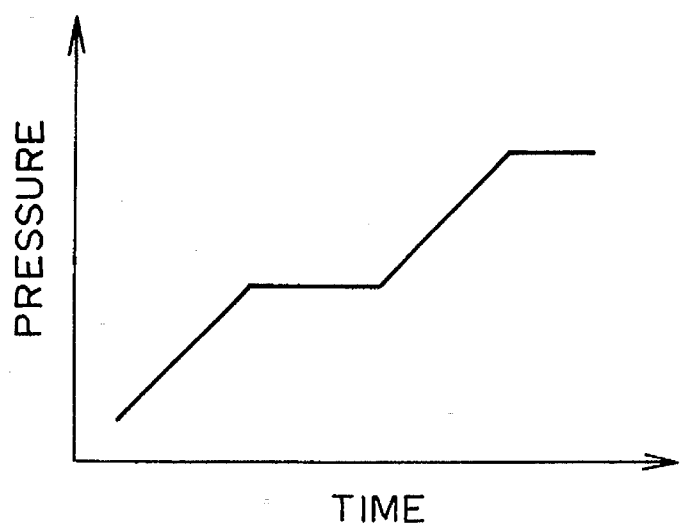
FIG. 1 is a graph showing a generalized pressure-increasing profile used in a liquid crystal injection step according to an embodiment of the invention.
Figure 2:
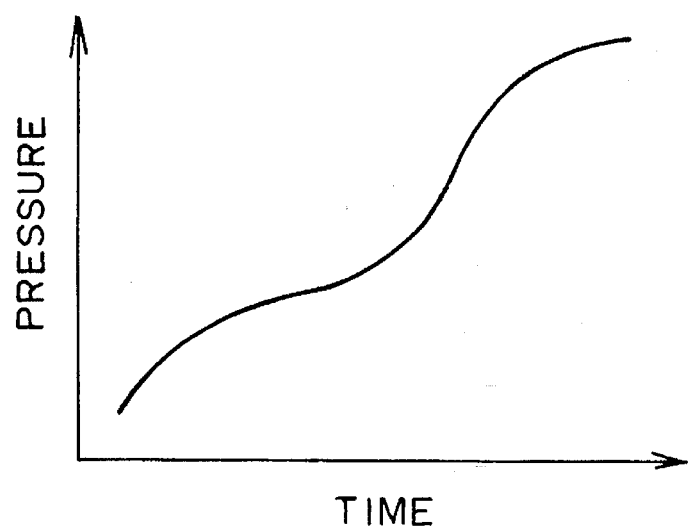
FIG. 2 is a graph showing a generalized pressure-increasing profile used in a liquid crystal injection step according to another embodiment of the invention.
Figure 14:
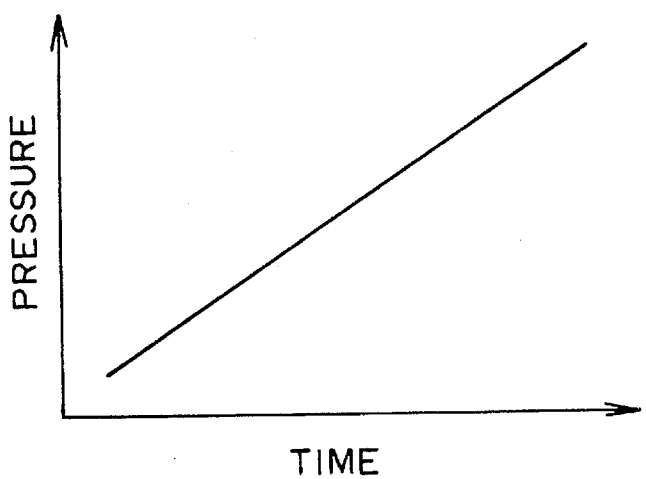
FIG. 14 is a graph showing a pressure profile adopted in a conventional liquid crystal injection step.

According to a second embodiment, a liquid crystal panel is produced by injecting a liquid crystal material through an injection port into a panel formed by fixing a pair of substrates by the medium of a sealing member so as to retain a prescribed gap therebetween in a process, wherein the interior of the panel is reduced in pressure; a liquid crystal material in its smectic state is applied onto an injection port of the panel, and then the liquid crystal material is heated into its isotropic phase and injected under pressure into the panel in such a manner that the pressure is held once at a constant pressure before it reaches a final pressure as shown in FIG. 1 or the pressure is increased with a varying pressure-increasing rate (preferably including a point of inflection) as shown in FIG. 2, more specifically with a smaller pressure-increasing rate in an intermediate stage, thereby preventing the occurrence of an injection failure, such as a poor injection region or streak defects 135 between the injected liquid crystal portions 132, 133 and 134 during injection through an injection port 131 as shown in FIG. 14. Herein, the constant pressure may preferably be held for a period of 1–5 hours, more preferably 2–5 hours. If the holding period is less than 1 hour, an irregularity in alignment state can occur under severe drive conditions of the resultant liquid crystal panel. If the holding period exceeds 5 hours, streak defects can occur.

Except for the constant pressure-holding period, the pressure may preferably be increased at a rate of at least 135 torr/hr., more preferably at least 200 torr/hr. If the pressure-increasing rate is below 135 torr/hr, the streak defects are liable to occur under severe drive conditions of the resultant liquid crystal panel. By adopting the above-mentioned temperature-increasing and pressure-increasing step, the liquid crystal material may preferably be controlled to progress at a rate v(t) at time t from the start of the liquid crystal injection so as to satisfy a range of 0.5 $v_a \leq v(t) \leq 1.5\ v_a$, wherein $v_a$ denotes an average progress speed which may preferably be controlled within the range of 0.005–0.5 cm/min.

The above-mentioned average progress speed $v_a$ is determined by $$v_a = (1/T) \int_0^T v(t)dt.$$

If the average progress speed is below 0.005 cm/min., the streak defects are liable to occur because the injection speed is too small. In excess of 0.5 cm/min., alignment irregularity is liable to occur even if v(t) is controlled to satisfy the above range. Further, if v(t) is outside the above range, the liquid crystal progress speed during the injection fluctuates too much, so that it is difficult to obtain a homogeneous alignment state over the entire panel.

As a result, a homogeneously good alignment state can be obtained even in a large-sized panel.

According to a third embodiment of the present invention, a liquid crystal panel is produced by enclosing a liquid crystal within a panel formed by holding a pair of substrates by the medium of a sealing member so as to retain a prescribed gap therebetween, and then filling the panel with the liquid crystal material while heating the liquid crystal material and applying a pressure from the injection port toward the inside of the panel in such a manner that the liquid crystal material in the vicinity of the injection port is always held at a temperature for keeping the liquid crystal material in its isotropic state and the liquid crystal material inside the panel except for the vicinity of the injection port is at least once changed to a temperature for keeping the liquid crystal material in its smectic phase, thus filling the panel with a volume of the liquid crystal material close to the volume of the panel at its normal (operating or room) temperature and preventing the occurrence of a void at normal temperature or after storage at a low temperature.

Accordingly, the liquid crystal material within the panel is held in its smectic phase to cause a high density and suck the liquid crystal material in the isotropic state showing a low viscosity in the vicinity of the injection port into the inner port of the panel, whereby the period of the filling step, particularly the period of retaining a high temperature and high pressure state, can be shortened than before. Further, the influence on alignment control films formed on the inner faces of the panel can be minimized, thus minimizing the change in pretilt angle, whereby liquid crystal panels can be produced with stable qualities.

The liquid crystal used in the present invention may preferably be a smectic liquid crystal, more preferably a ferroelectric smectic liquid crystal.

Hereinbelow, the present invention will be described more specifically based on Examples.

EXAMPLE 1

A liquid crystal panel of almost A4-size (having a length L of 30 cm and a width W of 25 cm of an inner space to be filled with a liquid crystal) was prepared according to the second embodiment of the present invention.

First of all, two glass substrates were applied to each other with a sealing member disposed therebetween to form a blank panel. The inner space of the panel was reduced in pressure from the atmospheric pressure to $10^{-6}$ torr. Then, the panel was restored to a level of pressure not affecting a liquid crystal material, and a phenylpyrimidine-based ferroelectric liquid crystal composition in its smectic phase was applied onto the injection port of the panel. Then, the panel was restored to the atmospheric pressure and then again reduced in pressure to 1 torr. In this instance, the panel was warmed to convert the liquid crystal material into the isotropic phase and, after confirming that the liquid crystal material was in the isotropic phase, the pressure was started to be increased. The pressure was increased according to a pressure-increasing profile as shown in FIG. 1. More specifically, the pressure was increased at a rate of 190 torr/hr while an intermediate pressure was retained for 2 hours and a final pressure of 2000 torr was retained for 6 hours. The liquid crystal panel produced through injection in the above-described manner was free from streak defects as injection traces or regions of injection failure and showed no defects during drive at room temperature.

The average liquid crystal progress speed $v_a$ during the above injection step was 0.020 cm/min., and the progress speed v(t) was controlled within the range of 0.018 cm/min.$\leq$v(t)$\leq$0.022 cm/min. as shown in FIG. 7.

EXAMPLE 2

Figure 3:
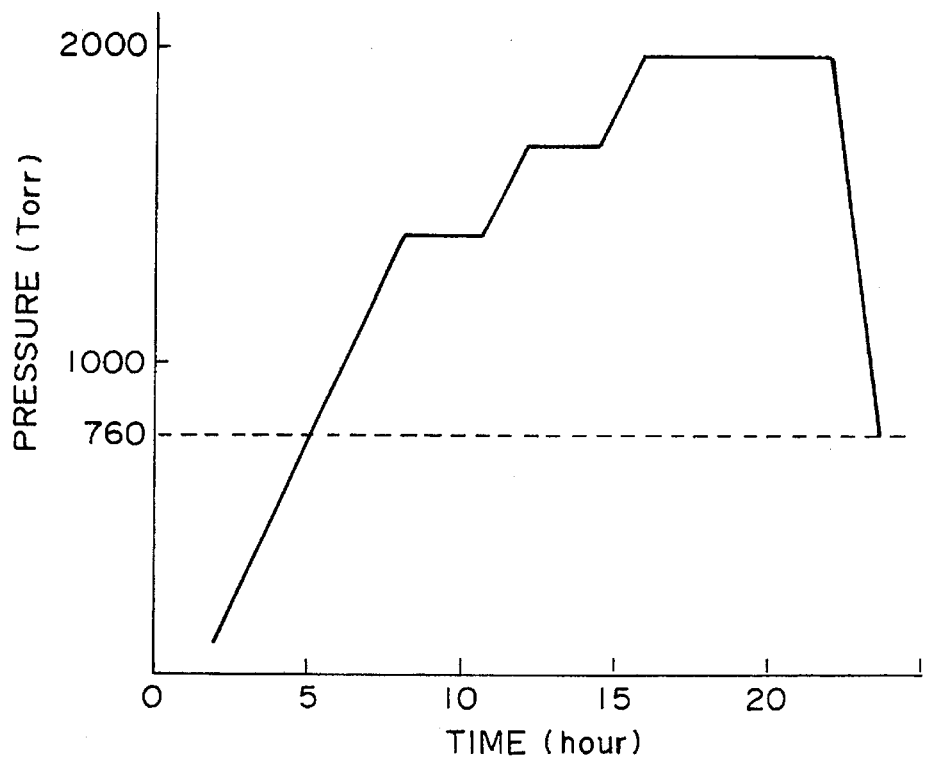
FIGS. 3 and 4 are graphs showing specific pressure-increasing profiles adopted in Examples 2 and 3, respectively, described hereinafter.

A blank panel identical to the one in Example 1 was provided. The inner space of the panel was reduced in pressure from the atmospheric pressure to $10^{-6}$ torr. Then, the panel was restored to a level of pressure not affecting a liquid crystal material, and a phenylpyrimidine-based ferroelectric liquid crystal composition in its smectic phase was applied onto the injection port of the panel. Then, the panel was restored to the atmospheric pressure and then again reduced in pressure to 100 torr (about 20 min.). In this instance, the panel was warmed to convert the liquid crystal material into the isotropic phase and, after keeping this state for 100 min, the pressure was started to be increased. The pressure was increased according to a pressure-increasing profile as shown in FIG. 3. More specifically, the pressure was initially increased to 1400 torr at a rate of 217 torr/hr. within 6 hours, the pressure was retained for 2.5 hours and then increased to 1670 torr at the same rate within 1.5 hours, the pressure was retained for 2.5 hours and then increased to 1950 torr at the same rate, and the pressure of 1950 torr was retained for 6 hours and 15 min. The pressure was then restored to the atmospheric pressure within 1.5 hours to complete the liquid crystal injection.

During the injection step, the average liquid crystal progress speed $v_a$ was 0.020 cm/min. and the liquid crystal progress speed with time t(v) was within the range of 0.018–0.022 cm/min. As a result of controlling the liquid crystal progress speed in the above-described manner in the liquid crystal injection step, the resultant liquid crystal panel showed a good alignment state over the entire A4-size area. Further, the thus-obtained liquid crystal panel was free from streak defects as injection traces or regions of injection failure and showed no defects during drive over a wide temperature range.

EXAMPLE 3

Figure 4:
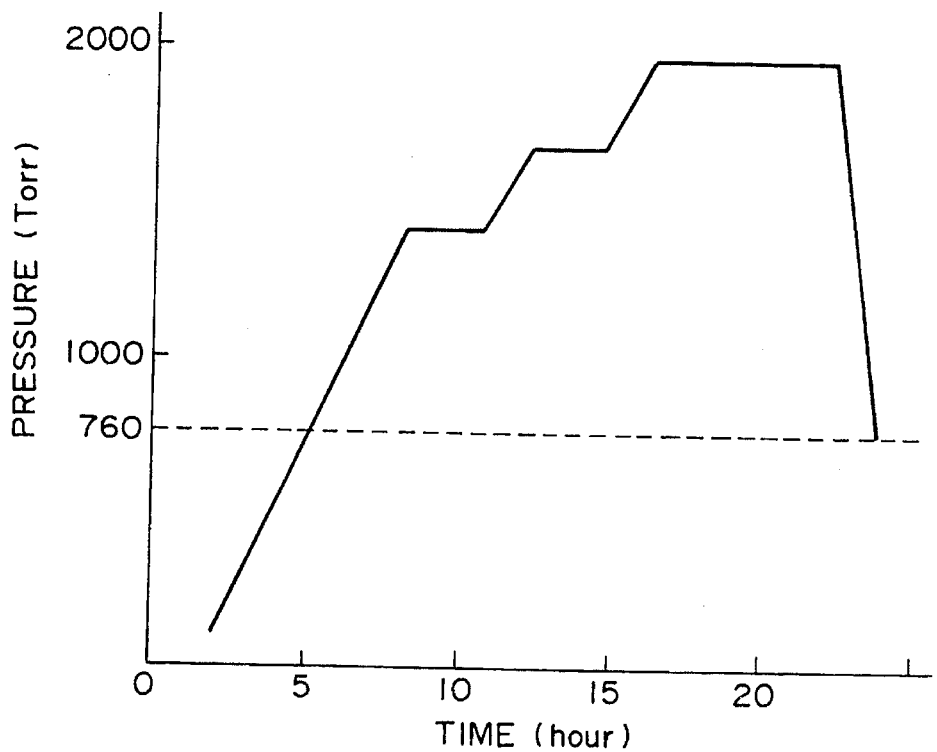
Figure 5:
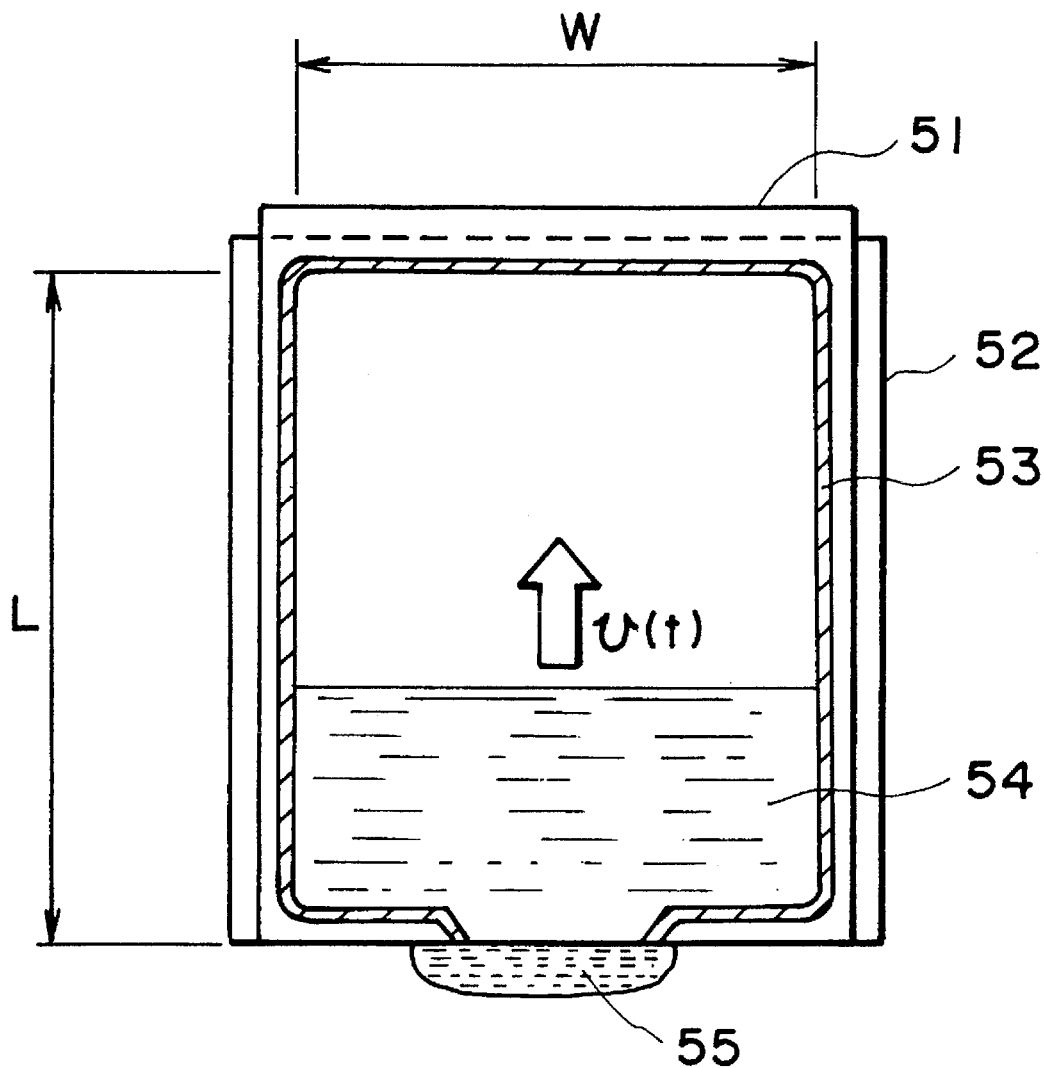
FIG. 5 is a schematic illustration of an intermediate state in a step of injecting a liquid crystal material into a panel according to the invention.
Figure 8:
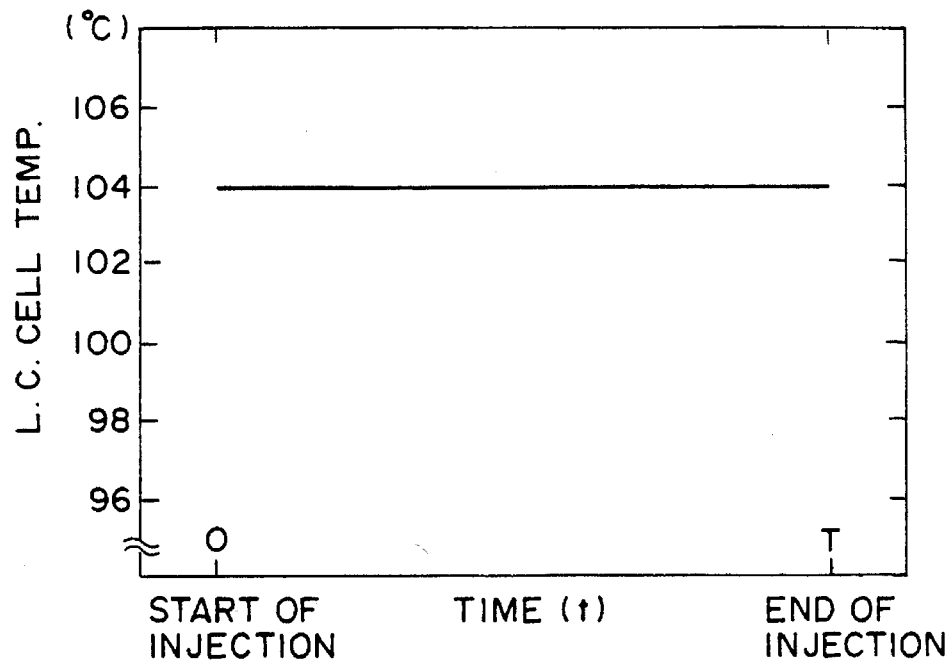
FIG. 8 is a graph showing a temperature profile of a liquid crystal cell in an injection step in a conventional process (Comparative Example 2).
Figure 9:
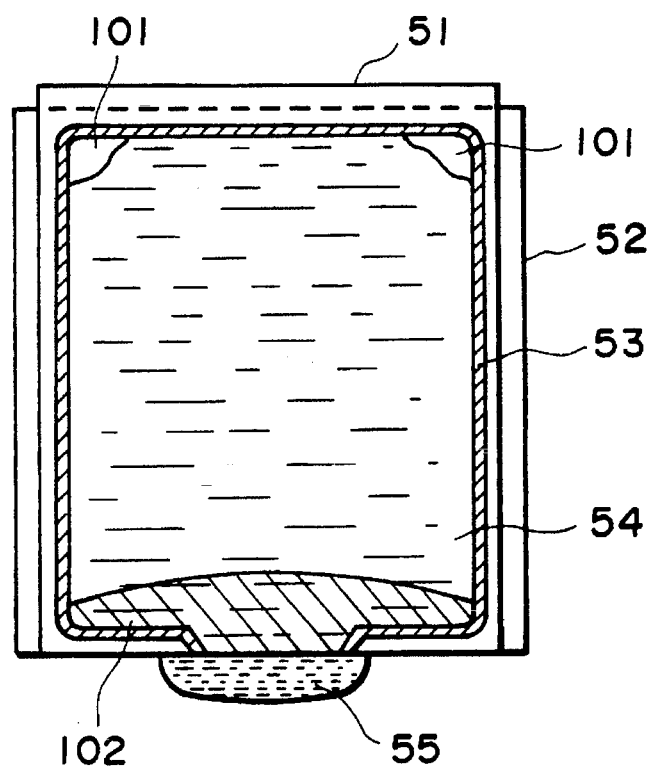
FIG. 9 is a schematic illustration of a state of a liquid crystal cell in a liquid crystal filling step after liquid crystal injection according to the invention.

A blank panel identical to the one in Example 1 was provided. The inner space of the panel was reduced in pressure from the atmospheric pressure to $10^{-6}$ torr. Then, the panel was restored to a level of pressure not affecting a liquid crystal material, and a phenylpyrimidine-based ferroelectric liquid crystal composition in its smectic phase was applied onto the injection port of the panel. Then, the panel was restored to the atmospheric pressure and then again reduced in pressure to 100 torr (about 20 min.). In this instance, the panel was warmed to convert the liquid crystal material into the isotropic phase and, after keeping this state for 100 min, the pressure was started to be increased. The pressure was increased according to a pressure-increasing profile as shown in FIG. 4. More specifically, the pressure was initially increased to 1400 torr at a rate of 217 torr/hr. within 6 hours, the pressure was retained for 2.5 hours and then increased to 1650 torr at a rate of 167 torr/hr. within 1.5 hours, the pressure was retained for 2.5 hours and then increased to 1950 torr at a rate of 200 torr/hr., and the pressure of 1950 torr was retained for 6 hours. The pressure was then restored to the atmospheric pressure within 1.5 hours to complete the liquid crystal injection. The thus-obtained liquid crystal panel showed no defects during drive over a wide temperature range.

Comparative Example 1

A blank panel identical to the one in Example 1 was provided. Similarly as in Example 1, the inner space of the panel was reduced in pressure from the atmospheric pressure to $10^{-6}$ torr. Then, the panel was restored to a level of pressure not affecting a liquid crystal material, and a phenylpyrimidine-based ferroelectric liquid crystal composition in its smectic phase was applied onto the injection port of the panel. Then, the panel was restored to the atmospheric pressure and then again reduced in pressure to 1 torr. In this instance, the panel was warmed to convert the liquid crystal material into the isotropic phase and, after confirming that the liquid crystal material was in the isotropic phase, the pressure was started to be increased. The pressure was increased according to a pressure-increasing profile as shown in FIG. 14. More specifically, the pressure was increased linearly to a final pressure of 2000 torr at rate of 120 torr/hour without a constant pressure-holding period.

Figure 13:
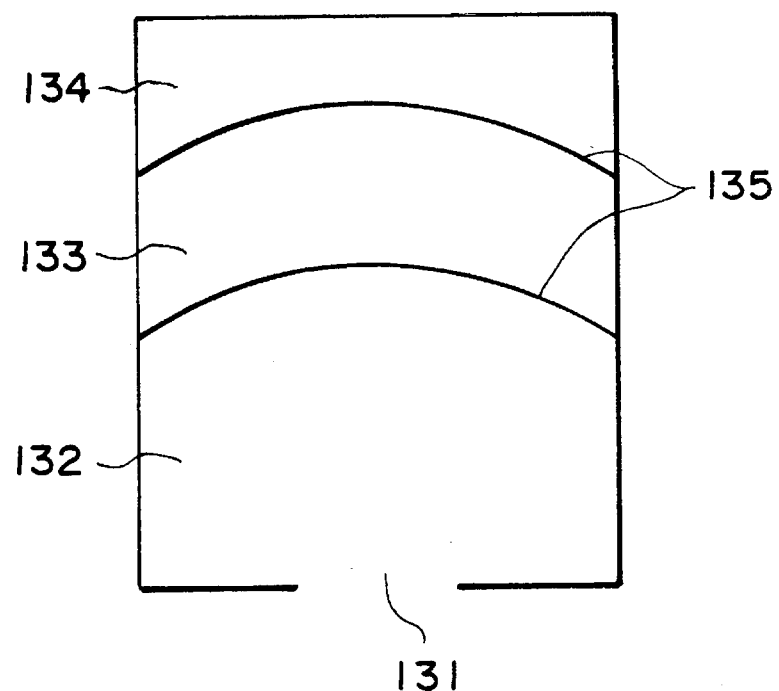
FIG. 13 is an illustration of a liquid crystal panel including defects formed by a conventional liquid crystal injection process.

As a result, the liquid crystal panel obtained through the above-described injection step showed streak defects 135 at boundaries between regions 132, 133 and 134 where the liquid crystal progress speed was believed to vary as shown in FIG. 13. The streak defects did not disappear during drive of the liquid crystal panel.

EXAMPLE 4

A liquid crystal panel of A4-size was prepared according to the first embodiment of the present invention.

Two glass substrates were respectively coated with an ITO (indium tin oxide) electrode film, which was then formed into a prescribed electrode pattern by photolithographic steps and further coated with an insulating film and an alignment film, followed by rubbing. On one of the substrate, a sealing adhesive for enclosing a liquid crystal was applied in a prescribed pattern. On the other substrate, spacer beads of about 1.5 µm and epoxy adhesive beads of 3–7 µm dispersed by stirring in isotropanol (100%) were sprayed through a spray nozzle and dispersed uniformly at a rate of 80 adhesive beads/mm$^2$ and the substrate provided with the sealing adhesive was applied, followed by curing under a pressure of 1 kg.f/cm$^2$ at 150° C. for 1 hour in an oven, to obtain a blank panel. The adhesive strength at this time was 25 g/mm$^2$.

The panel was placed within a vacuum chamber, which was then reduced in pressure from the atmospheric pressure to 1 torr at a rate of 19 torr/min. Then, a liquid crystal material was applied onto the injection port of the panel, and the pressure within the vacuum chamber was restored to the atmospheric pressure to inject the liquid crystal, followed by sealing of the injection port, to obtain a liquid crystal panel. The liquid crystal panel thus prepared showed a uniform cell gap over the entire panel area without causing peeling-off of the adhesive particles from the substrates.

EXAMPLE 5

A blank panel was prepared in the same manner as in Example 4 except that the adhesive beads were dispersed at a rate of 60 beads/mm$^2$. The adhesive strength at this time was 20 g/mm$^2$.

The panel was placed within a vacuum chamber, which was then reduced in pressure from the atmospheric pressure to 1 torr at a rate of 13 torr/min. Then, a liquid crystal material was applied onto the injection port of the panel, and the pressure within the vacuum chamber was restored to the atmospheric pressure to inject the liquid crystal, followed by sealing of the injection port, to obtain a liquid crystal panel. The liquid crystal panel thus prepared showed a uniform cell gap over the entire panel area similarly as in Example 4.

Comparative Example 2

Blank panels were prepared in the same manner as in Example 5.

The panels were placed within a vacuum chamber, which was reduced in pressure from the atmospheric pressure to 1 torr at a rate of 30 torr/min. As a result, because the pressure difference between inside and outside the panels was abruptly increased, most panels caused peeling-off of the adhesive particles from the substrates. Further, as a result of filling with the liquid crystal material, the resultant liquid crystal panels showed a remarkable gap irregularity and some caused breakage.

EXAMPLE 6

Figure 10:
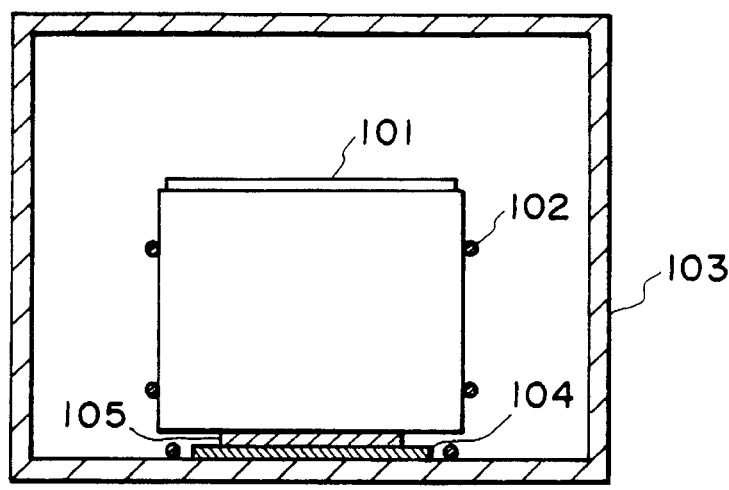
FIG. 10 is a schematic sectional view of an apparatus for practicing the liquid crystal injection step according to the invention.

A liquid crystal panel was prepared by using an apparatus as shown in FIG. 10 according to the third embodiment of the present invention.

Figure 11:
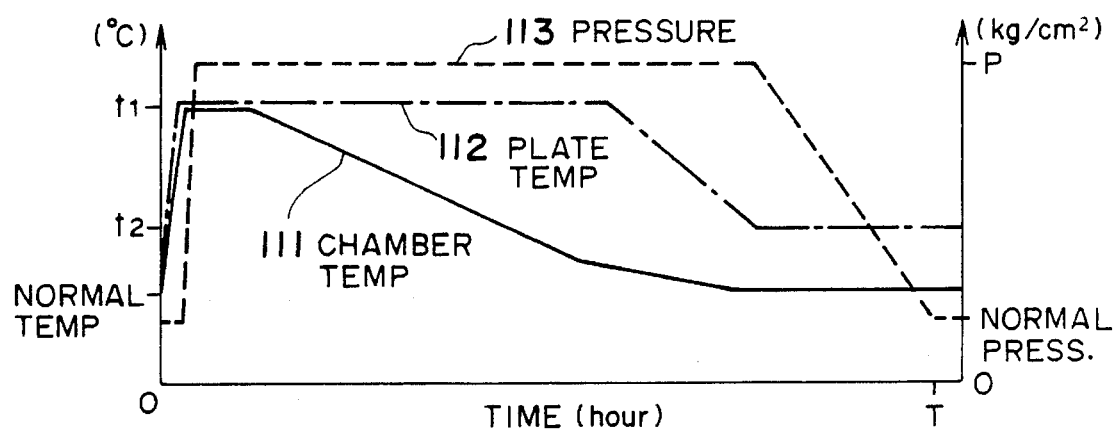
FIGS. 11 and 12 are graphs each showing temperature profiles of a pressure vessel and a plate heater, and a pressure profile within the pressure vessel in Examples 6 and 7, respectively, according to the invention.

Referring to FIG. 10, a panel 101 injected with a liquid crystal material was fixed by fixing members 102 within a pressure chamber 103 equipped with a plate heater 104 on which a tray 105 carrying a liquid crystal material was placed. In this Example, the temperature 111 and pressure 113 within the chamber as well as the plate temperature 112 were varied as shown in FIG. 11.

More specifically, a panel 101 preliminarily injected with a liquid crystal material but retaining some void in the vicinity of the injection port was fixed by the fixing members so that the injection port directed downward contacted the liquid crystal material on the tray 105. The panel 101 in this state was subjected to heating of the liquid crystal material and pressurization from the injection port toward the inside of the panel according to the program shown in FIG. 11. More specifically, the plate 104 was heated to a temperature $t_1$ of 82° C. and then cooled to a temperature $t_2$ of 60° C., and the pressure within the chamber 103 was increased to a pressure P of 2.5–3.5 kg.f/cm² and lowered to normal pressure within a period T of 6–15 hours.

The liquid crystal material used in this Example was a ferroelectric smectic liquid crystal ("CS-1014" (trade name), mfd. by Chisso K. K.) showing the following phase transition series:

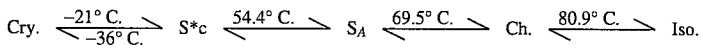

wherein Cry.: crystal phase, S*c: chiral smectic phase, $S_A$: smectic A phase, Ch.: cholesteric phase, and Iso.: isotropic phase.

First, the interior of the chamber 103 and the plate heater 104 were heated so that the liquid crystal material in the entire panel assumed isotropic phase at a temperature of 82° C. Then, the pressure within the chamber was increased so as to apply a pressure from the injection port toward the panel inside, thereby promoting the filling of the void in the panel with the liquid crystal material. In this state, chamber temperature alone was lowered so that the temperature of the liquid crystal material within the panel except for the vicinity of the injection port was transformed to a smectic phase at 60° C., thereby filling the panel with a volume of the liquid crystal material close to that at the panel normal temperature. Finally, the plate temperature was also lowered to have the liquid crystal material including the portion in the vicinity of the injection port assume a smectic phase, and the pressure within the chamber was also restored to normal pressure.

As a result, the filling density of the liquid crystal material within the panel was uniformized, and the void first present in the vicinity of the injection port disappeared entirely. After sealing the injection port, the liquid crystal panel was stored at a low temperature but caused substantially no re-occurrence of void thereafter.

EXAMPLE 7

Figure 12:
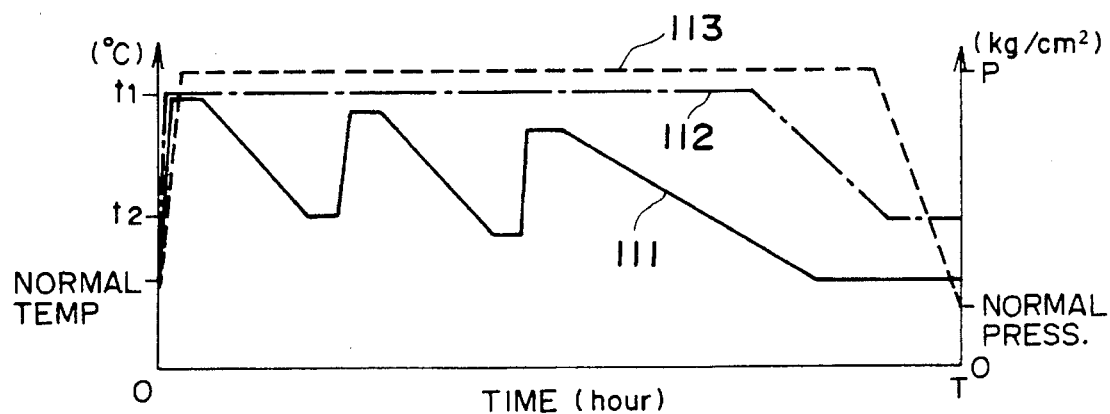

A liquid crystal panel was prepared in the same manner as in Example 6 except that the apparatus shown in FIG. 10 was operated according to temperature and pressure profiles as shown in FIG. 12.

In this example, the chamber temperature change cycle was repeated two times whereby the liquid crystal material filling was more completely effected, i.e., closer to the volume at the panel normal temperature. Further, even after the low temperature storage after sealing the injection port, the reoccurrence of void was not observed at all.

As described above, according to the present invention, the following advantages may be obtained through improvements in the liquid crystal injection and/or filling steps.

(1) The pressure applied to the panel from the inside toward the outside thereof can be minimized during the evacuation step to prevent the occurrence of gap irregularity and/or panel breakage.

(2) By appropriately controlling the pressurization conditions during the liquid crystal injection step, the liquid crystal progress speed within the panel may be controlled within an appropriate range, whereby a homogeneous alignment state can be accomplished over the entire panel area, and the injection failure, such as the occurrence of a region of injection failure and/or injection defects like streak defects, can be prevented. Further, the time required for injection can be shortened compared with the case where the pressure is linearly increased.

(3) By adopting an appropriate temperature control program in the liquid crystal filling step after the liquid crystal injection, the removal of void within the panel can be ensured to provide an increased yield. Further, the period of high temperature and high pressure can be shortened than before, thus providing a liquid crystal panel with stable quality and performances, through, e.g., prevention of a change in pre-tilt angle of liquid crystal molecules.

What is claimed is:

1. The process for producing a liquid crystal panel, comprising the steps of:

fixing a pair of substrates with a sealing member disposed therebetween to form a blank panel having a prescribed gap between the substrates and an injection port, reducing pressure within the cell, applying a liquid crystal material onto the injection port, heating the liquid crystal material to its isotropic temperature, and injecting the liquid crystal material into the panel under a pressure which increases at varying rates up to a maximum pressure, said liquid crystal being injected at a temperature which increases during injection.

2. A process according to claim 1, wherein the pressure for injection is held at a constant value for a prescribed period at least one time.

3. A process according to claim 2, wherein the prescribed period is 1–5 hours.

4. A process according to any of claims 1–3, wherein the pressure for injection is increased at a rate of at least 135 torr/hour except for a period of constant pressure.

5. A process for producing a liquid crystal panel, comprising the steps of:

fixing a pair of substrates with a sealing member disposed therebetween to form a blank panel having a prescribed gap between the substrates and an injection port, and injecting a liquid crystal material through the injection port into the panel, the liquid crystal material being injected at a temperature which increases during injection, said liquid crystal material progressing within the panel at a speed v(t) at a time t from the start of the injection satisfying $0.5v_a \leq v(t) \leq 1.5v_a$, wherein $v_a$ denotes an average speed within a range of 0.005–0.5 cm/min. determined by:

$$v_a = (1/T) \int_0^T v(t)\, dt,$$

wherein T denotes a total period of injection.

6. A process according to any of claims 1–3 and 5, wherein the liquid crystal material comprises a ferroelectric liquid crystal material.

7. A process according to claims 1 or 5, wherein the liquid crystal shows a smectic phase.

* * * * *

UNITED STATES PATENT AND TRADEMARK OFFICE
CERTIFICATE OF CORRECTION

PATENT NO. : 5,479,284
DATED : December 26, 1995
INVENTOR(S) : YASUYUKI WATANABE ET AL.

It is certified that error appears in the above-indentified patent and that said Letters Patent is hereby corrected as shown below:

ON TITLE PAGE

In [56] References Cited, Under FOREIGN PATENT DOCUMENTS: "4316021" should read --4-316021--.

COLUMN 4

Line 26, "suck" should read --introduce--.
Line 27, "in the isotropic state" should read --while in the isotropic state--.
Line 31, "shortened" should read --shorter--.

COLUMN 6

Line 40, "substrate," should read --substrates,--.
Line 45, "beads/mm$^2$" should read --beads/mm$^2$,--.

COLUMN 7

Line 44, "plate 104" should read --plate heater 104--.

UNITED STATES PATENT AND TRADEMARK OFFICE
CERTIFICATE OF CORRECTION

PATENT NO. : 5,479,284

DATED : December 26, 1995

INVENTOR(S) : YASUYUKI WATANABE ET AL.

It is certified that error appears in the above-indentified patent and that said Letters Patent is hereby corrected as shown below:

COLUMN 8

Line 67, "shortened" should read --shorter--.

Signed and Sealed this

Thirtieth Day of April, 1996

Attest:

BRUCE LEHMAN

Attesting Officer   Commissioner of Patents and Trademarks